US011678208B2

(12) United States Patent
Nainar et al.

(10) Patent No.: US 11,678,208 B2
(45) Date of Patent: Jun. 13, 2023

(54) FAILURE PREDICTION SIGNALING AND COGNITIVE USER MIGRATION

(71) Applicant: Cisco Technology, Inc., San Jose, CA (US)

(72) Inventors: Nagendra Kumar Nainar, Morrisville, NC (US); Carlos M. Pignataro, Raleigh, NC (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 17/225,501

(22) Filed: Apr. 8, 2021

(65) Prior Publication Data

US 2022/0330052 A1 Oct. 13, 2022

(51) Int. Cl.
| | |
|---|---|
| *H04W 24/04* | (2009.01) |
| *H04W 88/08* | (2009.01) |
| *H04W 48/16* | (2009.01) |
| *H04W 48/20* | (2009.01) |
| *H04W 48/02* | (2009.01) |

(52) U.S. Cl.
CPC ........... *H04W 24/04* (2013.01); *H04W 48/02* (2013.01); *H04W 48/16* (2013.01); *H04W 48/20* (2013.01); *H04W 88/08* (2013.01)

(58) Field of Classification Search
CPC ..... H04W 24/04; H04W 48/02; H04W 48/16; H04W 48/20; H04W 88/08
See application file for complete search history.

(56) References Cited

U.S. PATENT DOCUMENTS

| | | | | |
|---|---|---|---|---|
| 1,131,073 | A | * 3/1915 | Mosher et al. | ....... F16C 11/045 |
| | | | | 384/249 |
| 2011/0237260 | A1* | 9/2011 | Tsuruno | ................ H04W 36/26 |
| | | | | 455/437 |
| 2017/0238228 | A1 | 8/2017 | Zhang et al. | |
| 2019/0213504 | A1* | 7/2019 | Vasseur | ................ H04W 36/16 |
| 2019/0239100 | A1 | 8/2019 | Pandey et al. | |
| 2020/0120519 | A1 | 4/2020 | Horton et al. | |
| 2021/0168631 | A1* | 6/2021 | Chen | ..................... H04W 24/04 |
| 2021/0337402 | A1* | 10/2021 | Raizer | ................... H04L 43/065 |
| 2021/0410219 | A1* | 12/2021 | Bai | ........................ H04W 24/10 |
| 2022/0007213 | A1* | 1/2022 | Mokrushin | ........... B64C 39/024 |

FOREIGN PATENT DOCUMENTS

WO 2020069664 A1 9/2020

* cited by examiner

*Primary Examiner* — Abdullahi Ahmed
(74) *Attorney, Agent, or Firm* — Merchant & Gould P.C.

(57) ABSTRACT

Failure prediction signaling and cognitive user migration may be provided. A client device may receive at least a portion of failure prediction data. The client device may then analyze the at least the portion of the failure prediction data. The client device may then roam from a first computing device to a second computing device in response to analyzing the at least the portion of the failure prediction data.

20 Claims, 6 Drawing Sheets

FAILURE PREDICTION SIGNALING AND COGNITIVE USER MIGRATION

TECHNICAL FIELD

The present disclosure relates generally to failure prediction and cognitive user migration.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
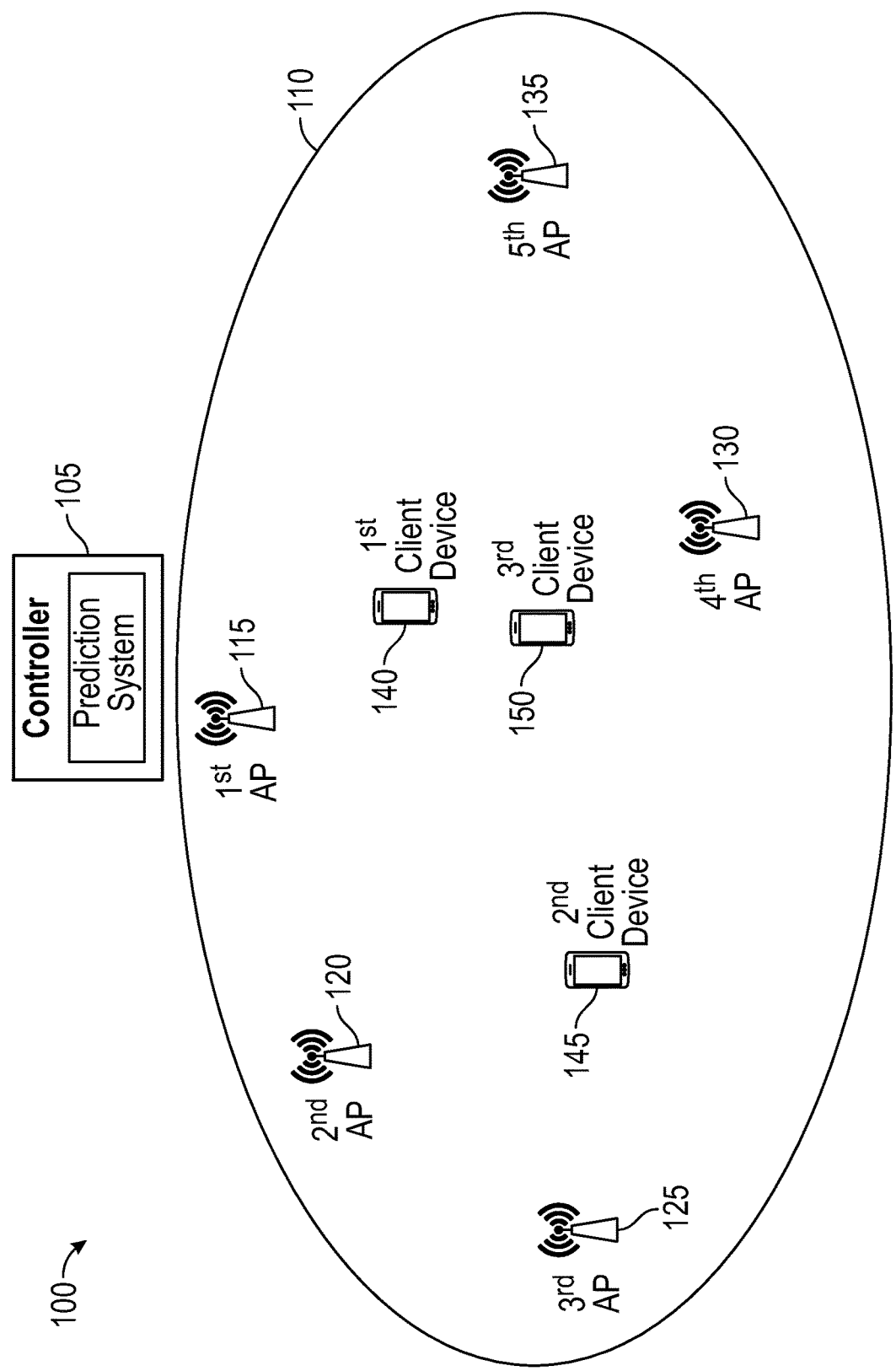
FIG. 1 is a block diagram of an operating environment for providing failure prediction signaling and cognitive user migration.

Failure prediction signaling and cognitive user migration may be provided. A client device may receive at least a portion of failure prediction data. The client device may then analyze the at least the portion of the failure prediction data. The client device may then roam from a first computing device to a second computing device in response to analyzing the at least the portion of the failure prediction data.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

High throughput wireless networking may comprise a business-critical tool. However, any failure in the wireless infrastructure (e.g., a Wireless Local Area Network controller (WLC) or an Access Point (AP) failure) may consume convergence time, and may be directly influenced by the time taken to detect the failure and react. As the wireless bandwidth goes up, the percentage of traffic loss similarly increases. For example, some wireless standards may offer 30 Gbps of bandwidth. As such, if a radio with 10 connected users fails, it may result in around 300+ Gbps of data loss (assuming the failure can be detected and the users may be reconnected to another AP within, for example, a second). Detection mechanisms, however, may be associated with rate shifting and retry logics. For example, a link evaluation algorithm may retry three times at a current rate (e.g., Modulation and Coding Scheme (MCS) 5), then rate shift from MCS 5 to MCS 4 for two retries, then jump to MCS 2 for one attempt, then to MCS 0 before deciding to panic scan. This may cause a total time cost, from AP failure to the scanning decision, of greater than two seconds without accounting for the scan/reassociation time.

Artificial Intelligence (AI) for networking has been introduced and various models have been proposed and used for failure prediction. In one study analyzing datacenter logs, it was noticed that 95% of events may happen within 400 ms of each other. Various models may also predict an event with a timer variant of around one or two seconds before the actual event happens. Some failure prediction tools may successfully predict WLC and AP failures in many scenarios. Yet the outcome may be limited to surfacing an alarm in an Information Technology (IT) administration management tool (e.g., a Digital Network Architecture Center (DNAC) controller), with a root cause once the issue has occurred. The effect of the failure, however, may still be the same for client devices on the wireless network. Note that failures may not necessarily be crashes. They may be crashes, but they may also be critical Over-the-Air (OTA) collision/retry levels, high Channel Utilization (CU), etc.

Embodiments of the disclosure may leverage such predictiveness behavior and extend the wireless control plane signaling mechanisms to signal the details. As such, predicted failure, the accuracy of the failure, and a potential AP list to which the client device may re-connect to may be signaled. In addition, embodiments of the disclosure may take proactive action at the infrastructure level, for example, signaling to the WLC an imminent AP failure, causing the WLC to increase the neighboring AP power.

FIG. 1 shows an operating environment 100 for providing failure prediction signaling and cognitive user migration. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125, a fourth AP 130, and a fifth AP 135. The plurality of APs may provide wireless network access to a plurality of client devices as they move within coverage environment 110. The plurality of client devices may comprise, but are not limited to, a first client device 140, a second client device 145, and a third client device 150. Ones of the plurality of client devices may comprise, but is not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow first client device 140, second client device 145, and third client device 150 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide failure prediction signaling and cognitive user migration. Controller 105 may also include a prediction system as described in greater detail below. In some embodiments the prediction system may comprise a standalone system.

The prediction system may apply processes that leverage Machine Learning (ML) models that may predict various degrees of failures. The failures may be related to the AP host itself (e.g., AP crash or radio freeze) or related to the AP services (e.g., high CU, buffer overrun, excessive client device count, etc.).

While embodiments of the disclosure may not be limited to a particular ML model, ML-based prediction may be probabilistic in nature. For example, as the contributing factors increase in number and individual occurrences, the probability of an event to occur, from low, soon becomes exponentially probable. Probability reaches 1 as the event occurs. However, it may be common to observe a point of probability increase acceleration (i.e., an elbow of no return). Passed that point, unless contributing events completely cease to occur, the only unknown may be the exact interval at which the individual contributing factors will reoccur, before the even happens. Once the elbow point is reached, the choice of the implementer is a decision based on a compromise between the probability value and the delay before probability reaches 1 (i.e., do we surface the alarm at p=0.7 and likely 800 ms before the expect reach of p=1, or do we wait a few more contributing events for p to reach 0.85 and p=1 within 200 ms).

The aforementioned decision process may be performed by the prediction system. As such, past a certain p value, the event may only be likely "not" to happen if the contributing factors suddenly cease to be present. The prediction system may surface this probability, and even if the implementer decides on a high p level for the alarm, the alarm and the counteractions described herein may occur before the event (i.e., a failure). Thus, consistent with embodiments of the disclosure, the prediction system may use the prediction/accuracy of the failures and inject this into a cognitive decision process as described below. The cognitive decision processes may comprise, but are not limited to: i) a cognitive user approach—the APs may be instructed with prediction and signaling, and may let the user (or the client device, automatically) take the cognitive decision of switching to a more suitable AP (e.g., user controlled switchover); ii) a cognitive AP approach—the APs may be instructed with prediction, take the cognitive decision, and signal the same to the users (e.g., backward compatibility); iii) a hybrid approach—this may comprise a hybrid mode where the AP includes its suggestion based on its own analysis and lets the user make a decision by considering the signaled details along with the details not available to the AP (e.g., user centric policy); and iv) a cognitive mitigation approach—neighboring APs and WLCs may be instructed with failure prediction and apply a what if counteractive process to limit the effect of the failure.

The elements described above of operating environment 100 (e.g., controller 105, first AP 115, second AP 120, third AP 125, fourth AP 130, fifth AP 135, first client device 140, second client device 145, or third client device 150) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 100 may be practiced in a computing device 600.

Cognitive User Approach

Figure 2:
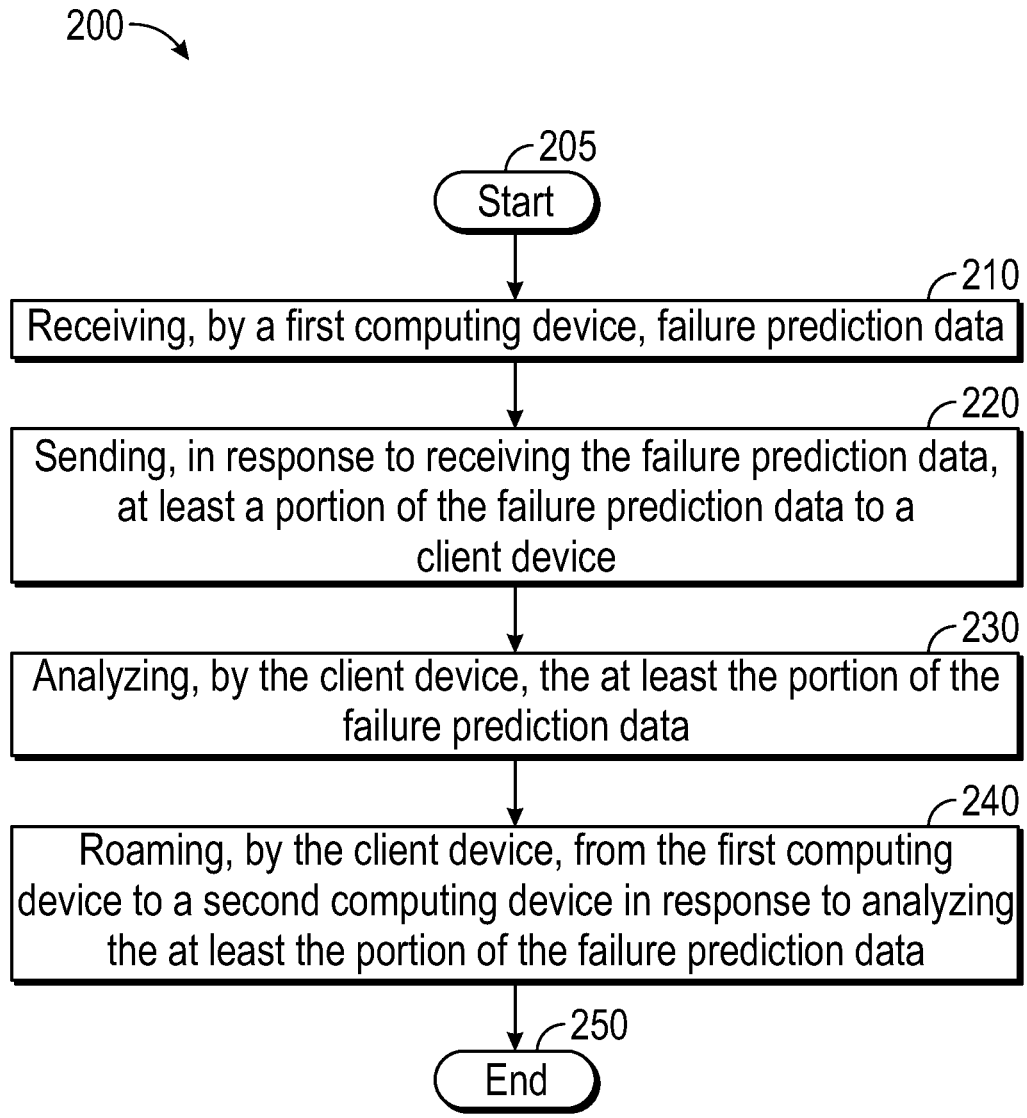
FIG. 2 is a flow chart of a method for providing failure prediction signaling and cognitive user migration.
Figure 3:
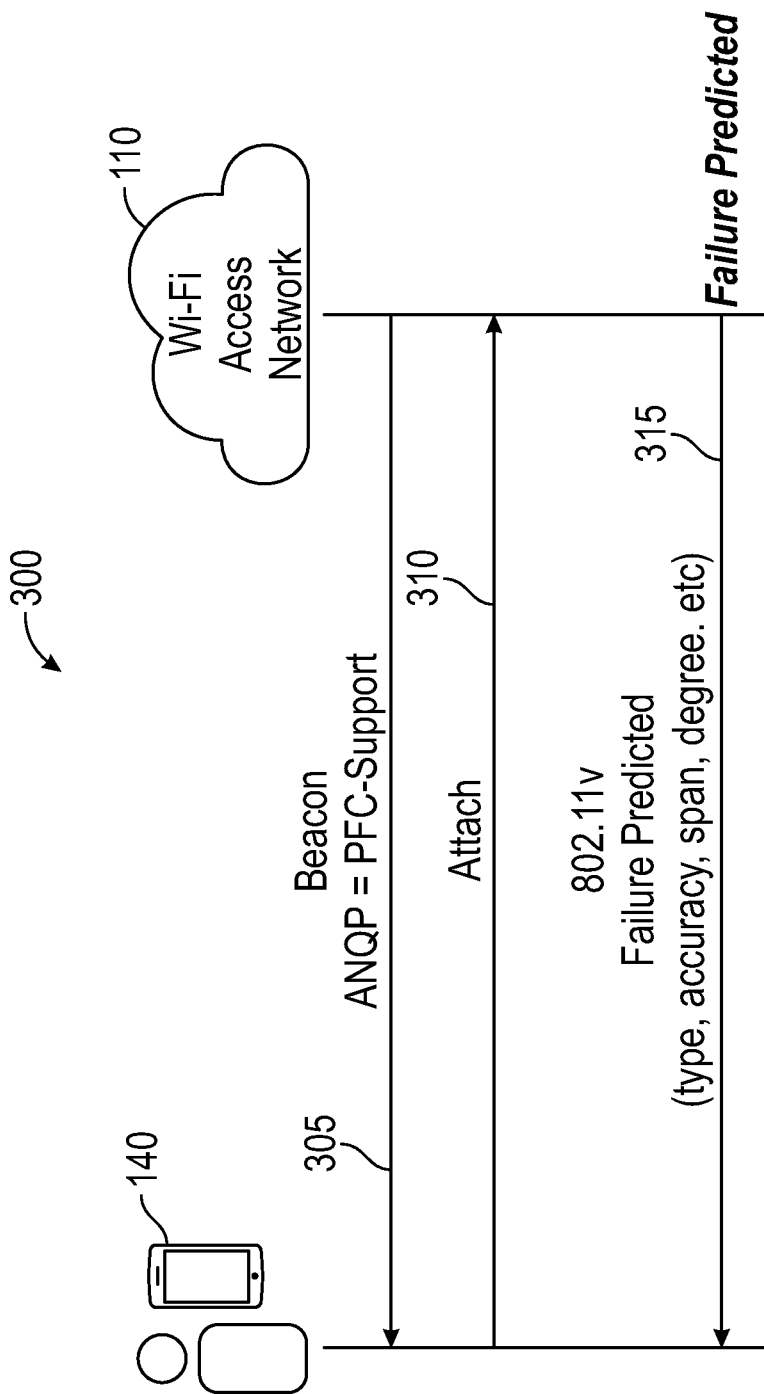
FIG. 3 is a flow diagram of a method for providing failure prediction signaling and cognitive user migration.

FIG. 2 is a flow chart setting forth the general stages involved in a method 200 consistent with embodiments of the disclosure for providing failure prediction signaling and cognitive user migration. Method 200 may be implemented using elements of operating environment 100 (e.g., first AP 115, first client device 140, etc.) as described in more detail above with respect to FIG. 1. Flow diagram 300, as shown in FIG. 3, is also used to illustrate method 200. Ways to implement the stages of method 200 will be described in greater detail below.

Method 200 may begin at starting block 205 and proceed to stage 210 where first AP 115 (e.g., a first computing device) may receive failure prediction data. For example, in this cognitive user approach, an AP and a client device may signal support for predictive failure signaling. As shown in FIG. 3, first client device 140 may attached to first AP 115 in coverage environment 110 (stages 305 and 310 of FIG. 3). First AP 115 may receive the failure prediction data indicating a failure prediction from the prediction system. The failure prediction data may comprise, but is not limited to, a type of a predicted failure, a probability of the predicted failure, a time span until the predicted failure, and a degree of the predicted failure.

From stage 210, where first AP 115 receives the failure prediction data, method 200 may advance to stage 220 where first AP 115 (e.g., first computing device) may send, in response to receiving the failure prediction data, at least a portion of the failure prediction data to first client device 140 (stage 315 of FIG. 3). For example, the portion of the failure prediction data may indicate that a failure of first AP 115 (e.g., the first computing device) may be likely to occur within a predetermined threshold.

Once first AP 115 sends, in response to receiving the failure prediction data, at least the portion of the failure prediction data to first client device 140 in stage 220, method 200 may continue to stage 230 where first client device 140 may analyze at least the portion of the failure prediction data. For example, first AP 115 may transparently signal client device 140 (e.g., an Access Network Query Protocol (ANQP) messages or an 802.11v extension) a failure prediction when the likelihood reaches a configurable threshold (e.g., first AP 115 crash 82.7% likely within 200 ms, first AP 115 resource exhaustion 76.4% likely within 800 ms, etc.). First client device 140 may analyze this information.

After first client device 140 analyzes at least the portion of the failure prediction data in stage 230, method 200 may proceed to stage 240 where first client device 140 may roam from first AP 115 to second AP 120 (e.g., a second computing device) in response to analyzing at least the portion of the failure prediction data. For example, the analysis of this information may nudge first client device 140 to roam (i.e., move) to a better AP (e.g., second AP 120). This roaming my occur before first AP 115 fails. Consistent with embodiments of the disclosure, this movement may not be because of Received Signal Strength Indicator (RSSI)/roaming logic, but rather because of the predicted failure. The first client device 140 may still own the final decision to execute the roam.

In addition, first client device 140 may perform proactive action subsequent to analyzing and prior to roaming. The proactive action may comprise, but is not limited to, one or more of emptying first client device 140's buffer, switching to a blocks Modulation and Coding Scheme (MCS), switching to a more robust MCS, starting a backup Multi-Link Device (MLD) link, and trigging a network-layer multipath link. Once first client device 140 roams from first AP 115 to second AP 120 in response to analyzing at least the portion of the failure prediction data in stage 240, method 200 may then end at stage 250.

Cognitive AP Approach

Figure 4:
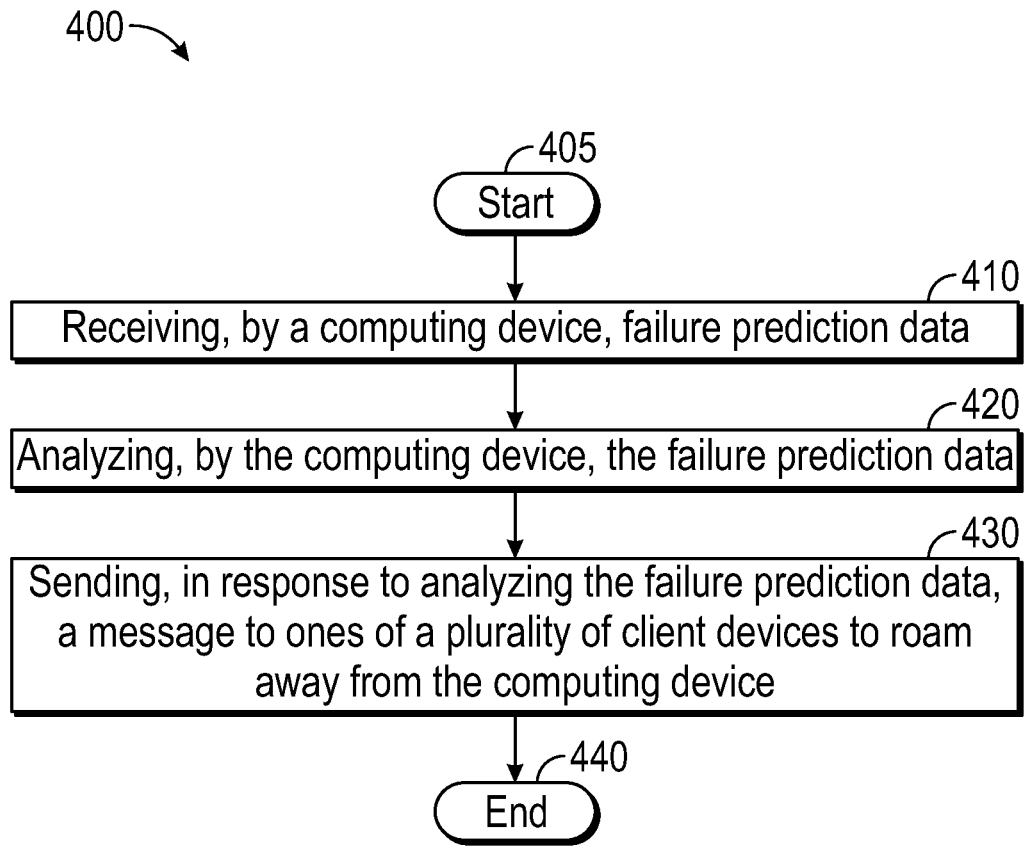
FIG. 4 is a flow chart of a method for providing failure prediction signaling and cognitive user migration.
Figure 5:
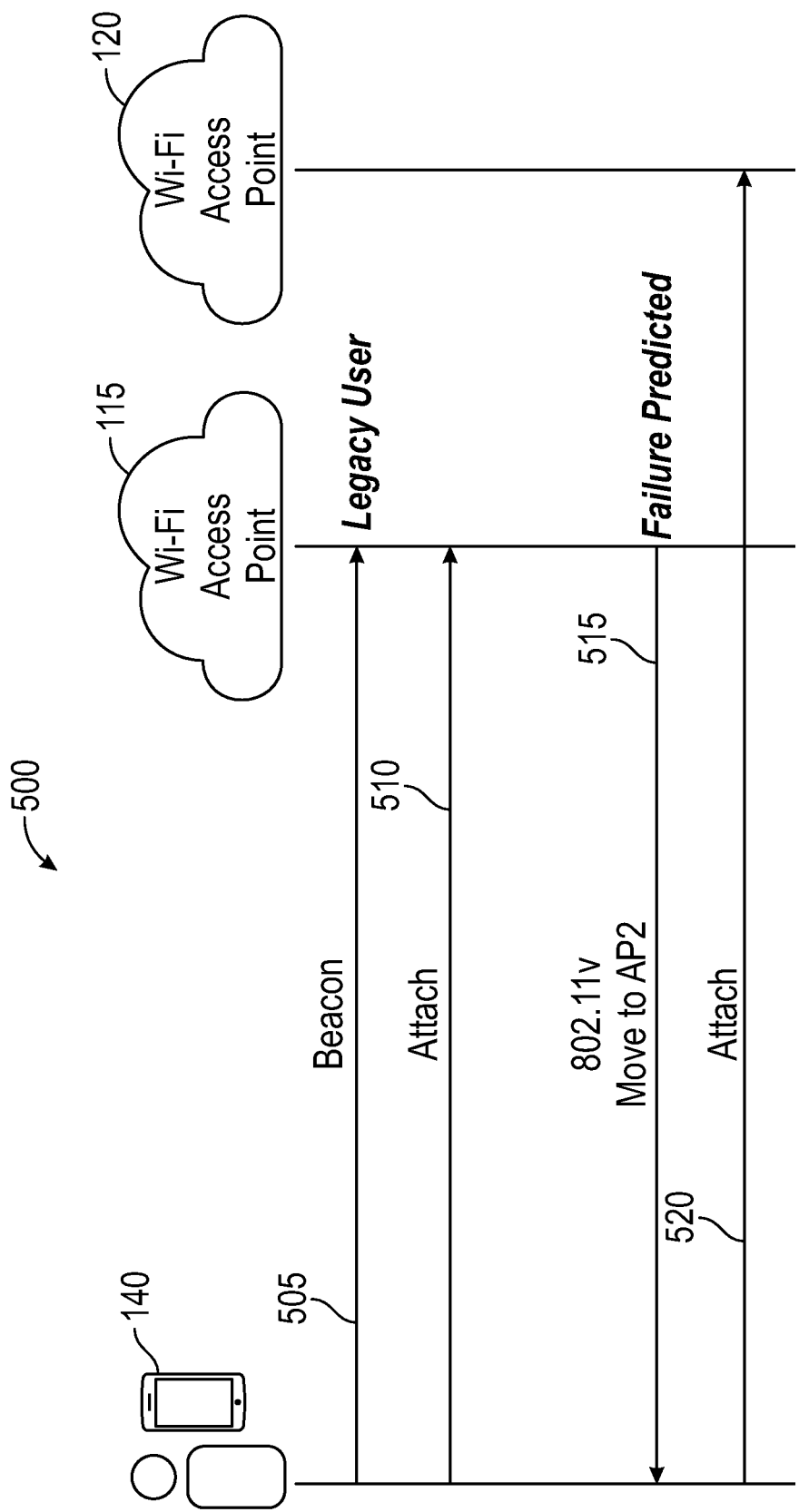
FIG. 5 is a flow diagram of a method for providing failure prediction signaling and cognitive user migration.

FIG. 4 is a flow chart setting forth the general stages involved in a method 400 consistent with embodiments of the disclosure for providing failure prediction signaling and cognitive user migration. Method 400 may be implemented using elements of operating environment 100 (e.g., first AP 115, first client device 140, etc.) as described in more detail above with respect to FIG. 1. Flow diagram 500, as shown in FIG. 5, is also used to illustrate method 400. Ways to implement the stages of method 400 will be described in greater detail below.

Method 400 may begin at starting block 405 and proceed to stage 410 where first AP 115 (e.g., a computing device) may receive failure prediction data. For example, the AP and the client device may or may not signal support for predictive failure signaling. While support may be expected for the cognitive user approach (as described above with respect to FIG. 2), support may not be required for the cognitive AP approach. As shown in FIG. 5, first client device 140 may attached to first AP 115 in coverage environment 110 (stages 505 and 510 of FIG. 5). The likely-to-fail-AP (e.g., first AP 115) may be instructed by the prediction system with the failure prediction (i.e., the failure prediction data).

From stage 410, where first AP 115 receives the failure prediction data, method 400 may advance to stage 420 where first AP 115 may analyze the failure prediction data. For example, analyzing the failure prediction data may comprise determining that a probability that first AP 115 may fail is greater than a predetermined threshold.

Once first AP 115 analyzes the failure prediction data in stage 420, method 400 may continue to stage 430 where first AP 115 may send, in response to analyzing the failure prediction data, a message to ones of the plurality of client devices to roam away from first AP 115. For example, first AP 115 may proactively instruct client devices (e.g., first client device 140) to move to a neighboring AP (e.g., second AP 120). First AP 115 may leverage the predicted failure, accuracy of the failure, and other user-specific policies to make a decision about moving client user devices to other APs.

For example, when the accuracy is 98%+, the chances of first AP 115 going down may be almost certain, so first AP 115 send a message (e.g., an 802.11v message) (stage 515 of FIG. 5) to all end users, requesting a move to a different AP (e.g., with will disconnect bit set and an interval lesser than the predicted failure time) (stage 520 of FIG. 5). In another embodiment, messages may be sent to client devices in order, by type (based on client category, traffic criticality etc.) so as to make sure that critical client devices survive. In another embodiment, first AP 115 action may be driven by the failure prediction. For example, if the accuracy is around 70%, first access point 115 may selectively instruct high profile, highly critical user devices to move to other access points, while leaving the other low critical user devices to react after the failure (if it happens). Once first AP 115 sends, in response to analyzing the failure prediction data, the message to the ones of the plurality of client devices to roam away from first AP 115 in stage 430, method 400 may then end at stage 440.

Hybrid Approach

Consistent with embodiments of the disclosure, first AP 115 may receive failure prediction data from the prediction system and may send it to first client device 140. First client device 140 may receive information comprising at least a portion of the failure prediction data, a suggested action, and comparative elements on neighboring computing devices. First client device 140 may analyze the information and take an action in response to analyzing the information. In some embodiments the action may comprises roaming, by first client device 140, from first AP 115 to second AP 120 comprising a neighboring AP. In other embodiments, the action may comprise switching, by first client device 140, to one of a Multi-Link Device (MLD) link, a 4G link, and a 5G link.

In this embodiment, the AP and the client device may signal support of predictive failure signaling. For example, first AP 115 may signal (e.g., an ANQP message or an 802.11v extension) the failure prediction when the likelihood reaches a (configurable) threshold, along with failure type and probability. First AP 115 may also provide suggested actions (e.g., 11v roam), along with comparative elements on neighboring APs (e.g., roam to second AP 120 suggested, CU 55%, retry 21%, or roam to third AP 125 suggested, CU 37%, retry 23%). Client device 140 may leverage details received via 802.11v from first AP 115 and use local policies to identify if it should move to a different AP or take other action (e.g. switch some traffic to MLD link or LTE, reduce/change codec etc.).

Cognitive Mitigation Approach

Consistent with embodiments of the disclosure, a computing device (e.g., controller 105) may receive failure prediction data from the prediction system. The computing device may analyze a configuration of a wireless network (e.g., coverage environment 110) taking into account the failure prediction data. The computing device may then reconfigure, in response to analyzing the configuration of the wireless network, the wireless network. In some embodiments reconfiguring the wireless network may comprise removing an AP from the wireless network when analyzing the configuration of the wireless network taking into account the failure prediction data indicates the AP is likely to fail. In other embodiments reconfiguring the wireless network may comprise, when analyzing the configuration of the wireless network taking into account the failure prediction data indicates a Channel Utilization (CU) on AP is greater than a predetermined threshold, increasing client count tolerance for the wireless network or causing the AP on the wireless network to refuse new associations.

In other words, the prediction system may signal to controller 105/neighboring APs the failure prediction for target APs. Controller 105/neighboring APs may run what-if mitigation scenarios to proactively correct the network configuration while accounting for the failure (e.g., if first AP 115 will crash, Radio Resource Management (RRM) may be triggered and may run with first AP 115 removed from the mix; if first AP 115 CU to exceed 60%, Overlapping Basic Service Set (OBSS) plan may be re-evaluated, tolerance to client count increased while first AP 115 starts refusing new associations, etc.).

Figure 6:
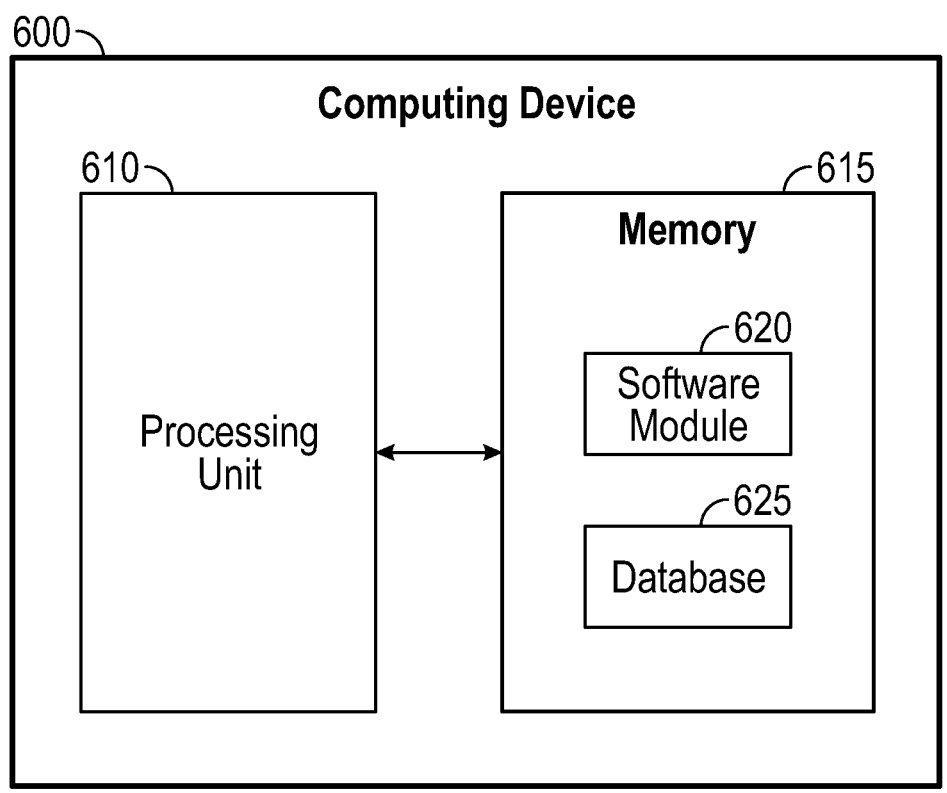
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing failure prediction signaling and cognitive user migration as described above with respect to FIG. 2, FIG. 3, FIG. 4, and FIG. 5. Computing device 600, for example, may provide an operating environment for controller 105, first AP 115, second AP 120, third AP 125, fourth AP 130, fifth AP 135, first client device 140, second client device 145, or third client device 150. Controller 105, first AP 115, second AP 120, third AP 125, fourth AP 130, fifth AP 135, first client device 140, second client device 145, or third client device 150 may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a computing device, failure prediction data;
    analyzing a configuration of a wireless network taking into account the failure prediction data; and
    reconfiguring, in response to analyzing the configuration of the wireless network, the wireless network wherein reconfiguring the wireless network comprises, when analyzing the configuration of the wireless network taking into account the failure prediction data indicates a Channel Utilization (CU) on an Access Point (AP) is greater than a predetermined threshold, at least one of increasing client count tolerance for the wireless network and causing the AP on the wireless network to refuse new associations.

2. The method of claim 1, wherein reconfiguring the wireless network comprises removing an Access Point (AP) from the wireless network when analyzing the configuration of the wireless network taking into account the failure prediction data indicates the AP is likely to fail.

3. The method of claim 1, wherein the failure prediction data includes a type of a predicted failure.

4. The method of claim 1, wherein the failure prediction data includes a probability of the predicted failure.

5. The method of claim 1, wherein the failure prediction data includes a time span until the predicted failure.

6. The method of claim 1, wherein the failure prediction data includes a degree of the predicted failure.

7. The method of claim 1, wherein the computing device comprises a controller of a wireless network.

8. The method of claim 1, wherein analyzing the configuration comprises using a Machine Learning (ML) model.

9. The method of claim 1, wherein the computing device comprises a controller of a prediction system.

10. A system comprising:
    a memory storage; and
    a processing unit, the processing unit coupled to the memory storage, wherein the processing unit is operative to:
    receive failure prediction data;
    analyze a configuration of a wireless network taking into account the failure prediction data; and
    reconfigure, in response to analyzing the configuration of the wireless network, the wireless network wherein reconfiguring the wireless network comprises, when analyzing the configuration of the wireless network taking into account the failure prediction data indicates a Channel Utilization (CU) on an Access Point (AP) is greater than a predetermined threshold, at least one of increasing client count tolerance for the wireless network and causing the AP on the wireless network to refuse new associations.

11. The system of claim 10, wherein the failure prediction data includes a type of a predicted failure.

12. The system of claim 10, wherein the failure prediction data includes a probability of the predicted failure.

13. The system of claim 10, wherein the failure prediction data includes a time span until the predicted failure.

14. The system of claim 10, wherein the failure prediction data includes a degree of the predicted failure.

15. The system of claim 10, wherein the processing unit being operative to analyze the configuration comprises the processing unit being operative to use a Machine Learning (ML) model.

16. A non-transitory computer-readable medium that stores a set of instructions which when executed perform a method executed by the set of instructions comprising:
    receiving, by a computing device, failure prediction data;
    analyzing a configuration of a wireless network taking into account the failure prediction data; and
    reconfiguring, in response to analyzing the configuration of the wireless network, the wireless network wherein reconfiguring the wireless network comprises, when analyzing the configuration of the wireless network taking into account the failure prediction data indicates a Channel Utilization (CU) on an Access Point (AP) is greater than a predetermined threshold, at least one of increasing client count tolerance for the wireless network and causing the AP on the wireless network to refuse new associations.

17. The A non-transitory computer-readable medium of claim 16, wherein the failure prediction data includes at least one of a type of a predicted failure, a probability of the predicted failure, a time span until the predicted failure, and a degree of the predicted failure.

18. The A non-transitory computer-readable medium of claim 16, wherein the computing device comprises a controller of a wireless network.

19. The A non-transitory computer-readable medium of claim 16, wherein analyzing the configuration comprises using a Machine Learning (ML) model.

20. The A non-transitory computer-readable medium of claim 16, wherein the computing device comprises a controller of a prediction system.

* * * * *